US012603533B2

(12) United States Patent
Geimer et al.

(10) Patent No.: US 12,603,533 B2
(45) Date of Patent: Apr. 14, 2026

(54) ROTOR ASSEMBLY FOR AN ELECTRIC MACHINE

(71) Applicant: BorgWarner Inc., Auburn Hills, MI (US)

(72) Inventors: Kevin Patrik Geimer, Homburg (DE); Henning Scheel, Neuhemsbach (DE); Tim Weiland, Worms (DE)

(73) Assignee: BORGWARNER INC., Auburn Hills, MI (US)

( * ) Notice: Subject to any disclaimer, the term of this patent is extended or adjusted under 35 U.S.C. 154(b) by 147 days.

(21) Appl. No.: 18/379,320

(22) Filed: Oct. 12, 2023

(65) Prior Publication Data

US 2024/0291336 A1 Aug. 29, 2024

(30) Foreign Application Priority Data

Feb. 24, 2023 (EP) .................................... 23158502

(51) Int. Cl.
*H02K 1/32* (2006.01)
*H02K 7/00* (2006.01)

(52) U.S. Cl.
CPC ............... *H02K 1/32* (2013.01); *H02K 7/003* (2013.01)

(58) Field of Classification Search
CPC ...... H02K 1/32; H02K 2213/03; H02K 7/003; H02K 9/19

(Continued)

(56) References Cited

U.S. PATENT DOCUMENTS 8,080,908 B2 * 12/2011 Matsubara ............... H02K 1/32
310/156.53
9,917,486 B2 * 3/2018 Kirkley, Jr. .............. H02K 1/32
(Continued)

FOREIGN PATENT DOCUMENTS

CN 115085432 A 9/2022
CN 115699521 A * 2/2023 ............. H02K 7/003
(Continued)

*Primary Examiner* — Alex W Mok
(74) *Attorney, Agent, or Firm* — Howard & Howard Attorneys PLLC

(57) ABSTRACT

The present disclosure relates to a rotor assembly for an electric machine. The rotor assembly comprises a rotating shaft, a rotor and a fluid cooling system. The rotor is fixed to the rotating shaft. The rotor comprises a rotor core, a first end plate and a second end plate. The first end plate is provided at a first axial end of the rotor core. The second end plate is provided at a second axial end of the rotor core. The fluid cooling system comprises at least one fluid cooling pathway provided internally in the rotor. The at least one fluid cooling pathway is configured to guide cooling fluid through the rotor, and comprises at least one cooling channel and a downstream end plate channel. The at least one cooling channel extends through the rotor core from the first axial end to the second axial end. The downstream end plate channel is fluidically connected to a downstream end of the at least one cooling channel. The downstream end plate channel is restricted radially outwards by a radially outer wall portion. The at least one cooling channel is restricted radially inwards by a radially inner wall portion. A radially innermost position of the radially outer wall portion is arranged in a range about or at or radially inwards of a radially innermost position of a radially inner wall portion.

20 Claims, 6 Drawing Sheets

(58) Field of Classification Search
USPC ........................................................... 310/59
See application file for complete search history.

(56) References Cited

U.S. PATENT DOCUMENTS

| | | | |
|---|---|---|---|
| 2011/0309697 A1* | 12/2011 | Kirkley, Jr. ............ | H02K 5/203 |
| | | | 310/64 |
| 2011/0309698 A1* | 12/2011 | Kirkley, Jr. .............. | H02K 3/24 |
| | | | 310/54 |
| 2016/0013704 A1* | 1/2016 | Wagner .................... | H02K 9/19 |
| | | | 310/54 |
| 2020/0036248 A1* | 1/2020 | Krais ........................ | H02K 1/30 |
| 2021/0218302 A1* | 7/2021 | Larson ..................... | H02K 3/24 |
| 2021/0384801 A1 | 12/2021 | Oh et al. | |

FOREIGN PATENT DOCUMENTS

| | | | | |
|---|---|---|---|---|
| DE | 102018111993 A1 * | 11/2019 | .............. | H02K 1/32 |
| EP | 4024668 A1 * | 7/2022 | ............. | H02K 3/527 |
| JP | 2010239799 A | 10/2010 | | |

* cited by examiner

A-A

B-B

ROTOR ASSEMBLY FOR AN ELECTRIC MACHINE

TECHNICAL FIELD

The present disclosure relates to a rotor assembly for an electric machine, specifically an electric motor. Furthermore, the present disclosure relates to an electric machine comprising the rotor assembly.

BACKGROUND

Electric machines have been used in various technical fields for the generation of kinetic energy for many decades. An electric machine (also called an electric motor or e-motor) is an electrical device that is configured to convert electrical energy into mechanical energy or vice versa (also referred to as electric generator). The mechanical energy may, in turn, be used to generate kinetic energy that may be utilized to drive other devices. An electric motor may generally comprise a stator and a rotor, which are housed in a motor casing. The stator may be fixed in position and the rotor may move relative to the stator. Commonly the rotor is rotatably fixed on a shaft that rotates with the rotor. The shaft may be used to transmit rotational energy to other devices. Most electric motors generate energy with a magnetic field and a winding current.

Depending on the configuration electric machines may be configured, for instance, as radial flux machines or axial flux machines. Radial flux machines usually comprise a rotor which is formed by a cylindrical body carrying magnets about its circumference. The stator is regularly configured hollow cylindrically and surrounds the rotor radially distanced. On its inner circumference, the stator usually carries several circumferentially distributed winding elements. Each winding element comprises a stator tooth which extends radially from a stator yoke towards the rotor. The stator tooth is wound by a wire of a metallic, good conducting material such as copper to form the winding. When an electric current is applied to the windings, the rotor attached to the shaft of the motor is subjected to a torque resulting from the magnetic field. The group of the rotor fixed on the shaft may be referred to as rotor assembly. Usually, the rotor assembly is rotatably supported by bearings in a housing of the electric machine.

The constant further development of electric motors and the trend towards using electric current as an energy carrier and source is leading to a continuous expansion of the application portfolio of electric motors. Electric motors are not only used in small electronic devices such as notebooks or household appliances, which are usually operated in the low-voltage range. Increasingly, electric motors of larger dimensions are also being used in the high-voltage range with operating voltages of up to 800 volts or 850 volts and more.

Electric motors, specifically in high-voltage applications, for instance traction motors for vehicles such as cars, typically generate excessive heat during operation. In operation of an electric motor, heat may be generated not only in the windings of the stator but also in the rotor due to eddy current losses which may affect the efficiency of motor performance and may even lead to demagnetization of the rotor and damage of the motor, or even failure. Therefore, various attempts have been made to cool the electric motor, and particularly the rotor. For instance, a fluid cooling system may be provided in the electric motor. Some fluid cooling approaches include internal cooling passages in the rotor and/or the stator.

The object of the present disclosure is to provide a more efficient fluid cooling system for an electric machine, and specifically for a rotor assembly.

SUMMARY

The present disclosure relates to a rotor assembly for an electric machine as defined in claim 1. The present disclosure further relates to an electric machine with such a rotor assembly as defined in claim 14. The dependent claims depict advantageous embodiments of the present disclosure.

According to a first aspect, the present invention relates to a rotor assembly for an electric machine. The rotor assembly comprises a rotating shaft, a rotor, and a fluid cooling system. The rotor is fixed to the rotating shaft. The rotor comprises a rotor core, a first end plate and a second end plate. The first end plate is provided at a first axial end of the rotor core. The second end plate is provided at a second axial end of the rotor core. The fluid cooling system comprises at least one fluid cooling pathway provided internally in the rotor. The at least one fluid cooling pathway is configured to guide cooling fluid through the rotor, and comprises at least one cooling channel and a downstream end plate channel. The at least one cooling channel extends through the rotor core from the first axial end to the second axial end. The downstream end plate channel is fluidically connected to a downstream end of the at least one cooling channel. The downstream end plate channel is restricted radially outwards by a radially outer wall portion. The at least one cooling channel is restricted radially inwards by a radially inner wall portion. A radially innermost position of the radially outer wall portion is arranged in a range about or at or radially inwards of a radially innermost position of the radially inner wall portion. Particularly in operating conditions where the centrifugal force is higher than the gravity force the filling level of cooling fluid in the at least one cooling channel can be increased compared to a rotor assembly whose downstream endplate channel, specifically radially outer wall portion, is not arranged as embodiment (e.g. which is further radially outward). Having an increased filling level leads to an improved cooling power and/or cooling efficiency which in turn may positively affect the efficiency of motor performance.

In embodiments, the range may extend 50% of a radial height of the at least one cooling channel radially outwards and/or radially inwards from the radially innermost position. Thereby a filling level of at least 50% relative to the radial height can be achieved in the cooling channel. Specifically, the range may extend 10% of a radial height of the at least one cooling channel radially outwards and/or radially inwards from the radially innermost position. Thereby a filling level of at least 90% relative to the radial height can be achieved in the cooling channel. More specifically, the range may extend 5% of a radial height of the at least one cooling channel radially outwards and/or radially inwards from the radially innermost position. Thereby a filling level of at least 95% relative to the radial height can be achieved in the cooling channel.

In embodiments, the radial height of the at least one cooling channel may be understood as the extension of the cooling channel in a radial direction. In other words, the radial height may be measured in a radial direction between the radial inner wall portion of the cooling channel and a radial outer wall portion of the cooling channel.

In embodiments, the at least one fluid cooling pathway may extend from a pathway inlet in one of the first end plate or the second end plate to a pathway outlet in one of the first end plate or the second end plate.

In embodiments, the pathway outlet may be arranged to discharge cooling fluid to an exterior of the rotor and/or inside a housing interior of a machine housing of the electric machine.

In embodiments, the pathway outlet may be arranged radially outward of the pathway inlet.

In embodiments, the pathway inlet may be arranged at a radially inner circumference of the rotor.

In embodiments, the pathway outlet may be arranged radially outwards of a radially inner circumference of the rotor.

In embodiments, the pathway outlet may be arranged at a radially outer circumference of the rotor or at a side face of the rotor.

In embodiments, the downstream end plate channel may be a first downstream end plate channel. The first downstream end plate channel may be further configured as an outlet channel of the at least one fluid cooling pathway to guide cooling fluid out of the rotor. By this arrangement, the filling level with cooling fluid of the at least one cooling channel whose downstream end is fluidically connected to the outlet channel can be increased compared to a downstream outlet channel which radially innermost position of the radially outer wall portion is not arranged in a range about or at or radially inwards of the radially innermost position of the radially inner wall portion restricting the second cooling channel radially inwards.

In embodiments, at least one fluid cooling pathway may comprise a first cooling channel and a second cooling channel. A downstream end of the second cooling channel may be fluidically connected to the outlet channel. By this arrangement, at least the filling level of the second cooling channel with cooling fluid can be increased compared to a downstream outlet channel which radially innermost position of the radially outer wall portion is not arranged in a range about or at or radially inwards of the radially innermost position of the radially inner wall portion restricting the second cooling channel radially inwards. The first cooling channel and the second cooling channel may be radially and/or circumferentially distanced. Specifically, the first cooling channel and second cooling channel may be radially and/or circumferentially separated in the rotor core. In embodiments, the at least one fluid cooling pathway may further comprise a second downstream end plate channel. The second downstream end plate channel may be configured as a connector channel to fluidically connect a downstream end of the first cooling channel and an upstream end of the second cooling channel. In embodiments, a radially innermost position of a radially outer wall portion restricting the connector channel radially outwards may be arranged in a range about or at or radially inwards of the radially innermost position of a radially inner wall portion restricting the first cooling channel radially inwards. In embodiments, the range may extend 50% of a radial height of the first cooling channel radially outwards and/or radially inwards from the radially innermost position. Thereby a filling level of at least 50% relative to the radial height can be achieved in the first cooling channel. Specifically, the range may extend 10% of a radial height of the first cooling channel radially outwards and/or radially inwards from the radially innermost position. Thereby a filling level of at least 90% relative to the radial height can be achieved in the first cooling channel. More specifically, the range may extend 5% of a radial height of the first cooling channel radially outwards and/or radially inwards from the radially innermost position. Thereby a filling level of at least 95% relative to the radial height can be achieved in the first cooling channel.

In embodiments, the at least one fluid cooling pathway may comprise a first cooling channel and a second cooling channel. The downstream end plate channel may be a first downstream end plate channel which is further configured as a connector channel to fluidically connect a downstream end of the first cooling channel and an upstream end of the second cooling channel. In embodiments, the first cooling channel and the second cooling channel may be radially and/or circumferentially distanced. In embodiments, the at least one fluid cooling pathway may further comprise a second downstream end plate channel which is configured as an outlet channel to guide cooling fluid out of the rotor. In embodiments, a downstream end of the second cooling channel may be fluidically connected to the outlet channel. In some embodiments, a radially innermost position of a radially outer wall portion restricting the outlet channel radially outwards may be arranged in a range about or at or radially inwards of the radially innermost position of the radially inner wall portion restricting the second cooling channel radially inwards.

In embodiments, the outlet channel may be configured and arranged to guide cooling fluid out of the fluid cooling pathway radially outwardly inclined relative to the axial direction. Thereby not only the rotor may be cooled by fluid cooling system but also a stator of the electric machine which surrounds the rotor radially outwardly.

In embodiments, the outlet channel may define the pathway outlet.

In embodiments, the downstream end plate channel may be arranged in one of the first end plate and the second end plate.

In embodiments, one of the connector channel and the outlet channel may be arranged in one of the first end plate and the second end plate. In some embodiments, the other of the connector channel and the outlet channel may be arranged in the other of the first end plate and the second end plate.

In embodiments, the at least one fluid cooling pathway may further comprise an inlet end plate channel to guide cooling fluid into the rotor. In embodiments, the inlet end plate channel may be arranged in one of the first end plate and the second end plate. In some embodiments, the inlet end plate channel and the outlet channel may be arranged in the same of the first end plate and the second end plate. In embodiments, the inlet end plate channel may define the pathway inlet. In embodiments, the inlet end plate channel may be fluidically connected to an upstream end of the at least one cooling channel.

In embodiments, the fluid cooling system may further comprise a cooling fluid supply arranged in the rotating shaft. The cooling fluid supply may be fluidically connected to the at least one fluid cooling pathway. Specifically, the cooling fluid supply may be fluidically connected to the inlet end plate channel. In embodiments, the rotating shaft may be configured as a hollow shaft or as a sleeved shaft which to provide cooling fluid from an external cooling fluid source to the at least one fluid cooling pathway. In embodiments, the cooling fluid supply may comprise at least one distribution hole. The at least one distribution hole may extend to an outer circumference of the rotating shaft to fluidically connect with the at least one fluid cooling pathway.

In embodiments, the fluid cooling system may comprise a plurality of fluid cooling pathways which are distributed circumferentially in the rotor. In embodiments, the fluid cooling pathways may be arranged alternatingly in the rotor. In some embodiments, a number of fluid cooling pathways may be equal to a number of magnetic poles of the rotor.

In embodiments, the rotor core may be formed of a plurality of steel plates.

In embodiments, the rotor core may be fixed to the rotating shaft.

In embodiments, the rotor core may be formed of a plurality of lamination stacks. The lamination stacks may be arranged axially adjacently. In embodiments, each of the lamination stacks may be formed of a group of laminated steel plates. In embodiments, the lamination stacks may be rotationally staggered.

In embodiments, the first end plate and the second end plate may be arranged to sandwich the rotor core from both axial sides in opposing axial directions.

In a second aspect, the present invention further relates to an electric machine. The electric machine comprises a machine housing, a stator assembly and a rotor assembly according to any one of the preceding embodiments. The machine housing defines a housing interior. The stator assembly is arranged in the housing interior. The rotor assembly is arranged in the housing interior. Specifically, the electric machine may be an electric motor. In alternative embodiments, the electric machine may be an electric generator. In other words, the electric machine may be an electric motor or an electric generator.

In embodiments of the electric machine, the stator assembly may be an annular stator assembly. The rotor assembly may be radially surrounded by the stator assembly.

In embodiments of the electric machine, the stator assembly may comprise a stator core and stator windings. In embodiments, the pathway outlet may be arranged to discharge cooling fluid to end turns of the stator windings inside the housing interior.

In embodiments of the electric machine, the rotating shaft may be rotationally supported in the machine housing.

BRIEF DESCRIPTION OF THE DRAWINGS

Other characteristics will be apparent from the accompanying drawings, which form a part of this disclosure. The drawings are intended to further explain the present disclosure and to enable a person skilled in the art to practice it. However, the drawings are intended as non-limiting examples. Common reference numerals on different figures indicate like or similar features.

DETAILED DESCRIPTION

Figure 1:
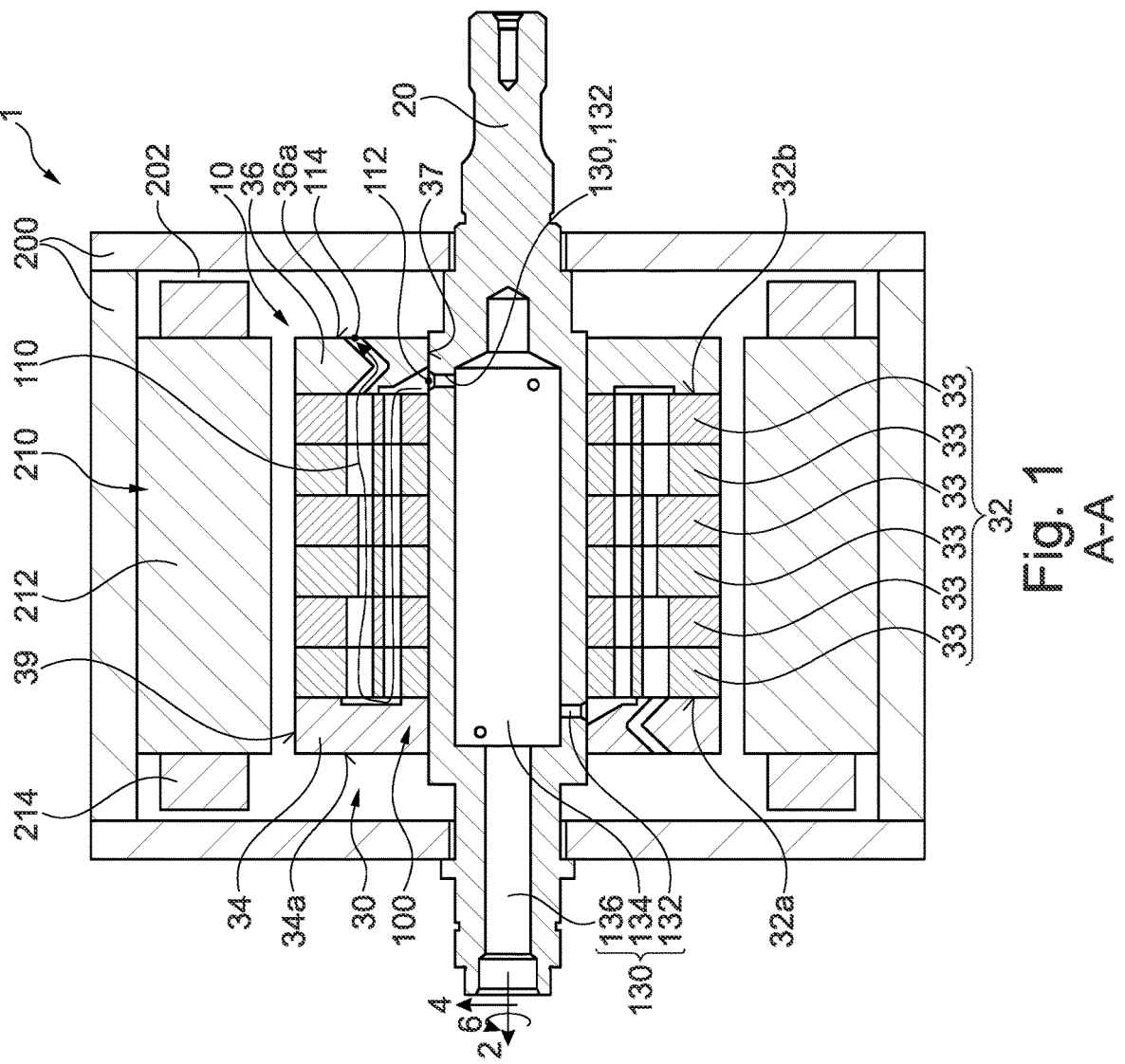
FIG. 1 Shows a schematically simplified side cut view of the electric machine according to the second aspect of the present disclosure and along the cut plane A-A of FIG. 2, and including a first example configuration rotor assembly.

Embodiments of the rotor assembly and the electric machine according to the present disclosure will be described in reference to the drawings as follows.

In the context of this application, the expression axial, axially or axial direction refer to a rotation axis of the rotor assembly 1 (and/or the rotating shaft 20 and/or the electric machine 1). With respect to the figures (see, FIGS. 1 to 7) the axial direction of the rotor assembly 10 is denoted by reference sign 2. The expression radial, radially or radial direction is to be understood relative to the axis/axial direction 2 of the rotor assembly 10 and is denoted with the reference sign 4. The expression circumferential, circumferentially, or circumferential direction is to be understood relative to the axis/axial direction 2 of the rotor 10 and is denoted with the reference sign 6. It should be understood that although one respective exemplary direction is shown in the respective figures, the respective counter direction also falls under the respective expression. For instance, FIG. 7 shows the circumferential direction 6 by a counterclockwise oriented arrow. However, a direction clockwise around the axis 2, may also be denoted the circumferential direction 6.

In the context of this application, the expression "at least one" may encompass, exactly one, specifically several or each of the plurality of elements, e.g. permanent magnets 50 and/or arms 120.

Figure 2:
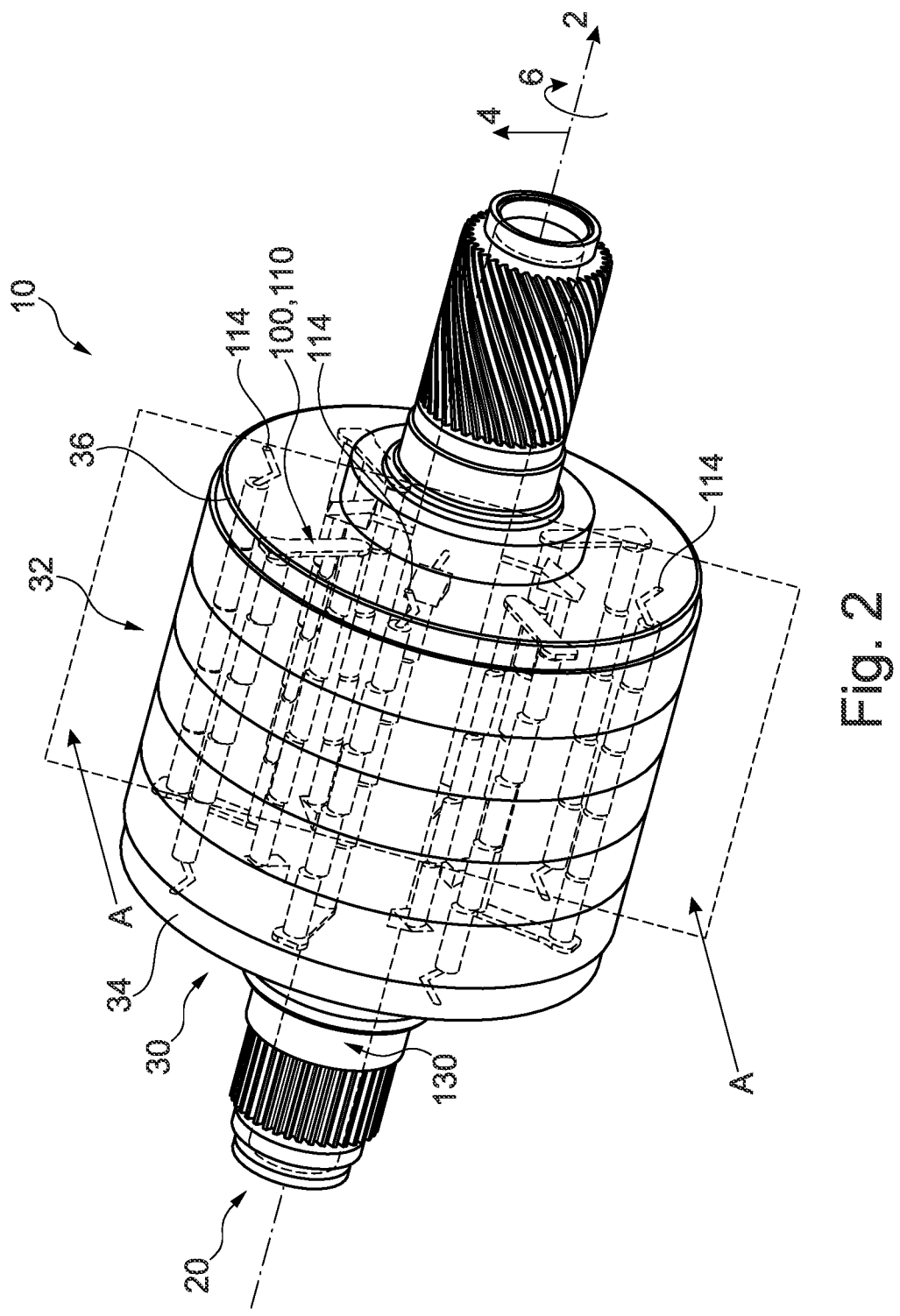
FIG. 2 Shows a perspective view of the first example configuration of the rotor assembly according to the first aspect of the present disclosure with the fluid cooling system schematically indicated inside the rotor assembly.

FIG. 1 illustrates an exemplary electric machine 1 in accordance with the second aspect of the present disclosure in a schematically simplified side cut view along the cut plane A-A of FIG. 2. The electric machine 1 comprises a machine housing 200, a stator assembly 210 and a rotor assembly 10 according the first aspect of the present disclosure. The machine housing 200 defines a housing interior 202. The stator assembly 210 is arranged in the housing interior 202. The rotor assembly 10 is arranged in the housing interior 202. Specifically, the depicted electric machine 1 may be configured as an electric motor. In alternative embodiments, the electric machine 1 may be an electric generator. In other words, the electric machine 1 may be an electric motor and/or an electric generator. The stator assembly 210 may be an annular stator assembly. The rotor assembly 10 may be radially surrounded by the stator assembly 210. Specifically, the rotor assembly 10 may be distanced from the stator assembly 210 by a radial gap. In other words, the electric machine 1 may be a radial gap machine or a radial flux machine.

As further shown in a schematically simplified way in FIG. 1, the stator assembly 210 may comprise a stator core 212 and stator windings 214. In this regard, stator end turns of the stator windings 214 can be seen in FIG. 1 (right and left of stator core 212).

The rotor assembly 10 according to the second aspect of the present disclosure will now be described in more detail with respect to FIGS. 1 to 7.

In this regard, FIG. 2 shows an exemplary rotor assembly 10 in a perspective view. Generally, the rotor assembly 10 comprises a rotating shaft 20, a rotor 30 and a fluid cooling system 100. The rotor 30 is fixed to the rotating shaft 20. The rotor 30 comprises a rotor core 32, a first end plate 34 and a second end plate 36. The rotor core 32 may be fixed, for instance pressed, on the rotating shaft 20. Specifically, the rotor core 32 may be rotationally and/or axially fixed to the rotating shaft 20. The rotor core 32 may be formed of a plurality of steel plates. As shown in FIG. 1, the rotor core 32 may be formed of a plurality of lamination stacks 33. In the example configuration of FIG. 1 six lamination stacks are arranged axially adjacently on the rotating shaft 20. In other embodiments, the rotor core 32 may be comprised of more or less than six lamination stacks 33, and in some embodiments of only one lamination stack 33. In FIG. 2, the rotor core 32 exemplary comprises five lamination stacks 33 but is otherwise the same as that shown in FIGS. 1 and 3. Each of the lamination stacks 33 may be formed of a group of laminated steel plates. As further shown in FIG. 1, the lamination stacks 33 may be rotationally staggered, commonly known as rotor skew. The rotational staggering may lead to advantageous magnetic effects of the electric machine 1. The rotor core 32 has a first axial end 32a and an opposing second axial end 32b. The first end plate 34 is provided at the first axial end 32a of the rotor core 32. The second end plate 36 is provided at the second axial end 32b of the rotor core 32. The first end plate 34 and the second end plate 36 may be arranged to sandwich the rotor core 32 from both axial sides 32a, 32b in opposing axial directions 2. The end plates 34, 36 may provide axial compression force for the rotor core 32. In embodiments, the end plates 34, 36 may provide a means for dynamic balancing of the rotor assembly 30. Therefore, the end plates 34, 36 may also be referred to as balance rings 34, 36 (i.e. first balance ring 34 and second balance ring 36, respectively). Similar as the rotor core 32, the end plates 34, 36 may be fixed, specifically rotationally and axially fixed, to the rotating shaft 20. The rotor 30 has a first side face 34a and an axially opposing second side face 36a. The first side face 34a and the second side face 36a are outer side faces 34a, 36a which are arranged on an exterior of the rotor 30. More specifically, the first end plate 34 defines the first side face 34a. The second end plate 36 defines the second side face 36a. The first and second side faces 34a, 36a may defines axial ends of the rotor 30. As further shown in FIG. 1, the rotor 30 has an inner circumference 37 which may be defined at its radial inner surface. An outer circumference 39 of rotor 30 may be defined at its radial outer surface. In other words, the rotor 30 extends axially between the first end face 34a and the second end face 36a. The rotor 30 may extend radially between the inner circumference 37 and the outer circumference 39. The rotor 30 may be arranged on the rotating shaft 20 with the inner circumference 37 being arranged on an outer circumference of the rotating shaft 20. The rotating shaft 20 may be rotationally supported in the machine housing 200.

Figure 3:
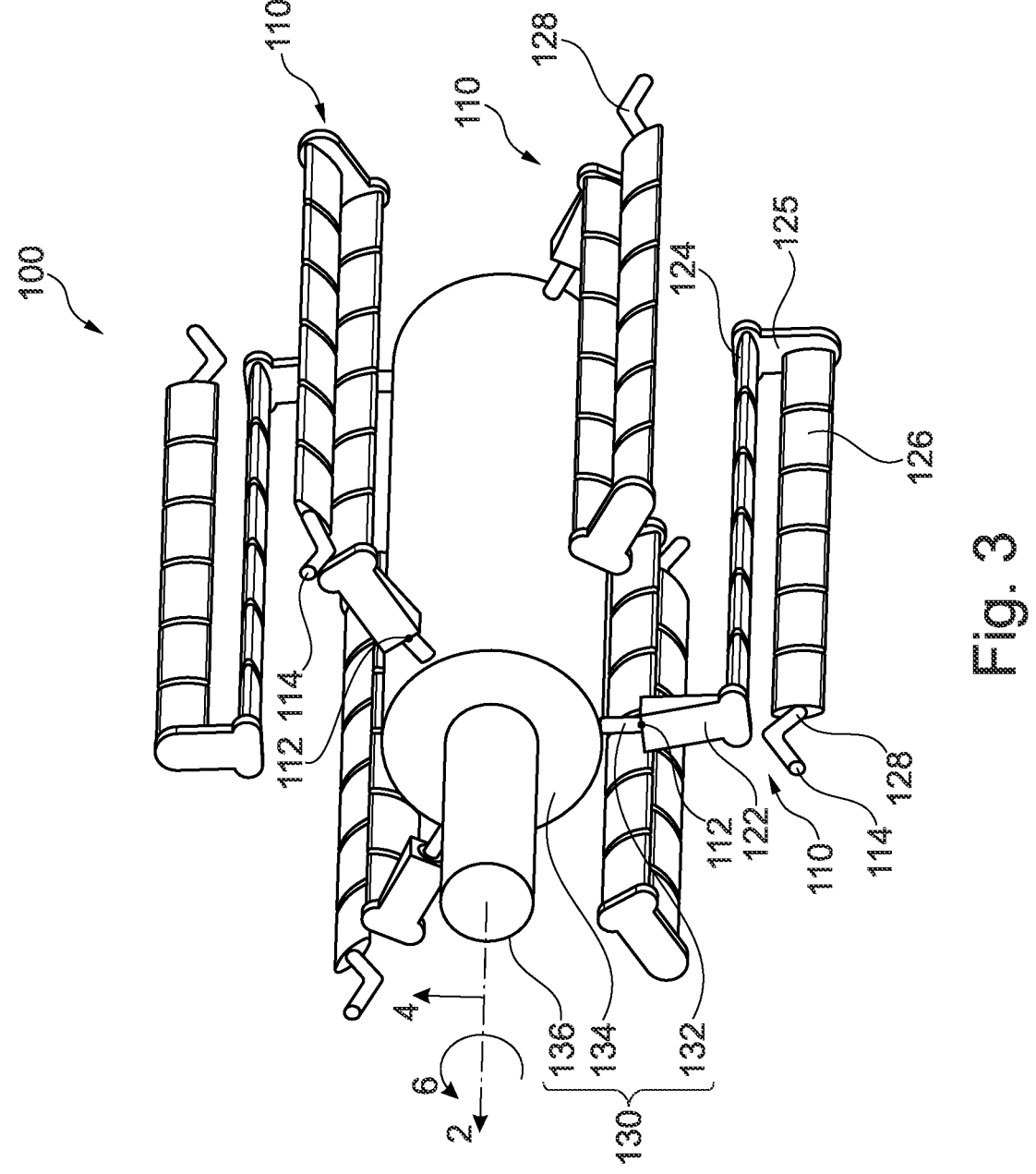
FIG. 3 Shows a schematic perspective view of the extracted fluid cooling system of the first example configuration rotor assembly with six fluid cooling pathways.

FIG. 2 schematically indicates an exemplary fluid cooling system 100 of the rotor assembly 10 with dashed lines. A negative model of the same fluid cooling system 100 is shown in FIG. 3.

Generally, the fluid cooling system 100 comprises at least one fluid cooling pathway 110 provided internally in the rotor 30. The at least one fluid cooling pathway 110 is configured to guide cooling fluid through the rotor 30 which is indicated by the arrow in FIG. 1 (In FIGS. 4, 5 and 6 the fluid cooling pathway 110 is indicated by several arrows). More specifically, the at least one fluid cooling pathway 110 may extend from a pathway inlet 112 to a pathway outlet 114. In other words, the fluid cooling pathway 110 enters the rotor 30 at the pathway inlet 112. The fluid cooling pathway 110 exits the rotor 30 at the pathway outlet 114. The pathway outlet 114 may be arranged to discharge cooling fluid to an exterior of the rotor 30. Specifically, the pathway outlet 114 may be arranged to discharge cooling fluid inside a housing interior 202 of the machine housing 200 of the electric machine 1. More specifically and as seen in FIG. 1, the pathway outlet 114 may be arranged to discharge cooling fluid to end turns of the stator windings 214 inside the housing interior 202. Respective channels forming the pathway outlets 114 may be configured and arranged to discharge cooling fluid to end turns of the stator windings 214 inside the housing interior 202. Thereby, not only the rotor 30 but also the stator 210, specifically the stator end turns of stator windings 214 can be cooled by cooling fluid of the fluid cooling system 100. The pathway inlet 112 may be provided in one of the first end plate 34 or the second end plate 36. The pathway outlet 114 in one of the first end plate 34 or the second end plate 36. Depending on the configuration of the rotor assembly, more specifically depending on the configuration of the fluid cooling pathway 110, the pathway inlet 112 and the pathway outlet 114 can be arranged in the same end plate 34, 36 or in different end plates 34, 36. In embodiments, it may also be possible that one or more fluid cooling pathways 110 comprise more than one pathway inlets 112 and/or pathway outlets 114 which may be provided in the same end plate 34, 36 and/or in different end plates 34, 36.

The pathway outlet 114 may be arranged radially outward of the pathway inlet 112. Thereby, during operation, cooling fluid may flow, driven by centrifugal force arising in the rotor assembly 10, from the pathway inlet 112 to the pathway outlet 114. In preferred embodiments, the pathway inlet 112 may be arranged at the radially inner circumference 37 of the rotor 30 (see, e.g. FIG. 1). However, it also may be possible to provide the pathway inlet 112, radially outwardly distanced from the inner circumference, for instance one of the side faces 34a, 36a. In such cases, a suited cooling fluid supply from the rotating shaft 20, e.g. by a hub, could be fluidically connected to the pathway inlet 112.

As further shown in FIG. 1, the pathway outlet 114 is arranged radially outwards of the radially inner circumference 37 of the rotor 30. Specifically, the pathway outlet 114 is arranged a side face 34a, 36a of the rotor 30. In other embodiments (not shown), the pathway outlet 114 could also be arranged at the outer circumference 39 of the rotor 30, for instance in a portion of one of the end plates 34, 36 adjacent to the rotor core 32.

Generally, and as shown in FIGS. 1 to 7, at least one fluid cooling pathway 110 comprises at least one cooling channel 124, 126 and a downstream end plate channel 125, 128. The at least one cooling channel 124, 126 extends through the rotor core 32 from the first axial end 32a to the second axial end 32b. The downstream end plate channel 125, 128 is fluidically connected to a downstream end of the at least one cooling channel 124, 126. The downstream end plate channel 125, 128 is restricted radially outwards by a radially outer wall portion 125a, 128a (see, particularly FIGS. 4 to 6). The at least one cooling channel 124, 126 is restricted radially inwards by a radially inner wall portion 124a, 126a. A radially innermost position 125b, 128b of the radially outer wall portion 125a, 128a is arranged in a range about or at or radially inwards of a radially innermost position 124b, 126b of the radially inner wall portion 124a, 126a. Particularly in operating conditions where the centrifugal force is higher than the gravity force, the filling level of cooling fluid in the at least one cooling channel 124, 126 can be increased compared to a rotor assembly 10 whose downstream end plate channel, specifically its radially outer wall portion, is not arranged as embodiment (i.e. which is further radially outward).

Having an increased filling level leads to an improved cooling power and/or cooling efficiency which in turn may positively affect the efficiency of the performance of the electric machine 1.

Specifically, the at least one cooling channel 124, 126 may penetrate through the rotor core 32. In other words, the at least one cooling channel 124, 126 forms a passage through the rotor core 32.

In embodiments "at" can be understood that the radially innermost position 125b, 128b of the radially outer wall portion 125a, 128a can be minimally above (radially outwards) or minimally below (radially inwards) of the radially innermost position 124b, 126b of the radially inner wall portion 124a, 126a. "A radial position" may be understood as any position on an envelope circle about the axis/axial direction 2 of the rotor 10, the envelope circle being defined by a radius equal to a line from the axis of the rotor 10 to the radial position (see, for instance the dashed circle sections in FIG. 7).

In embodiments, the range may extend 50% of a radial height 124c, 126c of the at least one cooling channel 124, 126 radially outwards and/or radially inwards from the radially innermost position 124b, 126b. Thereby a filling level of at least 50% relative to the radial height 124c, 126c can be achieved in the cooling channel 124, 126. Specifically, the range may extend 10% of a radial height 124c, 126c of the at least one cooling channel 124, 126 radially outwards and/or radially inwards from the radially innermost position 124b, 126b. Thereby a filling level of at least 90% relative to the radial height 124c, 126c can be achieved in the cooling channel 124, 126. More specifically, the range may extend 5% of a radial height 124c, 126c of the at least one cooling channel 124, 126 radially outwards and/or radially inwards from the radially innermost position 124b, 126b. Thereby a filling level of at least 95% relative to the radial height 124c, 126c can be achieved in the cooling channel 124, 126. Generally, the range can be measured from the radially innermost position 124b, 126b of the radially inner wall portion 124a, 126a in both radial directions, e.g. 50% of the radial height 124c, 126c in a radial outward direction and 50% of the radial height 124c, 126c in a radial inward direction. Generally, the radial height 124c, 126c of the at least one cooling channel 124, 126 may be understood as the extension of the cooling channel 124, 126 in a radial direction 4. In other words, the radial height 124c, 126c may be measured in a radial direction 4 between the radial inner wall portion 124a, 126a of the cooling channel 124, 126 and a radial outer wall portion of the cooling channel 124, 126.

In the following, the four example configurations as shown in the figures will be described in more detail. Although specific features may be only described with respect to one of the example configurations, one or more features of one or more example configurations may be combined with one or more features of another example configuration. All example configurations have in common that at least one downstream end plate channel 125, 128 is configured to increase the filling level of a cooling channel 124, 126 whose downstream end is fluidically connected to the at least one downstream end plate channel 125, 128 during operation.

FIGS. 1, 2, 3 and 5 show the first example configuration of the rotor assembly 10, more specifically of the fluid cooling system 100. In the first example configuration, the fluid cooling system 100 comprises six fluid cooling pathways 110. The six fluid cooling pathways 110 are configured similarly. Therefore, the details of the fluid cooling pathways 110 will be explained by the example of one fluid cooling pathway 110. However, it should be noted that in other embodiments, the one or more fluid cooling pathways 110 may be configured differently.

As specifically seen in FIG. 3, the fluid cooling pathways 110 are distributed circumferentially in the rotor 30. The fluid cooling pathways 110 are arranged alternatingly in the rotor 30. For instance, one fluid cooling pathway 110 is arranged such that its pathway outlet 114 is arranged in the first end plate 34 and an adjacent fluid cooling pathway 110 is arranged such that its pathway outlet 114 is arranged in the second end plate 36. Although, six fluid cooling pathways 110 are comprised in the fluid cooling system 100 of the first example configuration, in other embodiments more or less than six may comprised six fluid cooling pathways 110 may be comprised in the fluid cooling system 100. In other words, the fluid cooling system 100 may comprise a plurality of fluid cooling pathways 110 which are distributed circumferentially in the rotor 30. In some embodiments, a number of fluid cooling pathways 110 may be equal to a number of magnetic poles of the rotor 30. The rotor core 32 comprises a plurality of circumferentially distributed magnetic poles which are however, for simplicity reasons not visible in the figures. The magnetic poles may be formed by permanent magnets.

Figure 5:
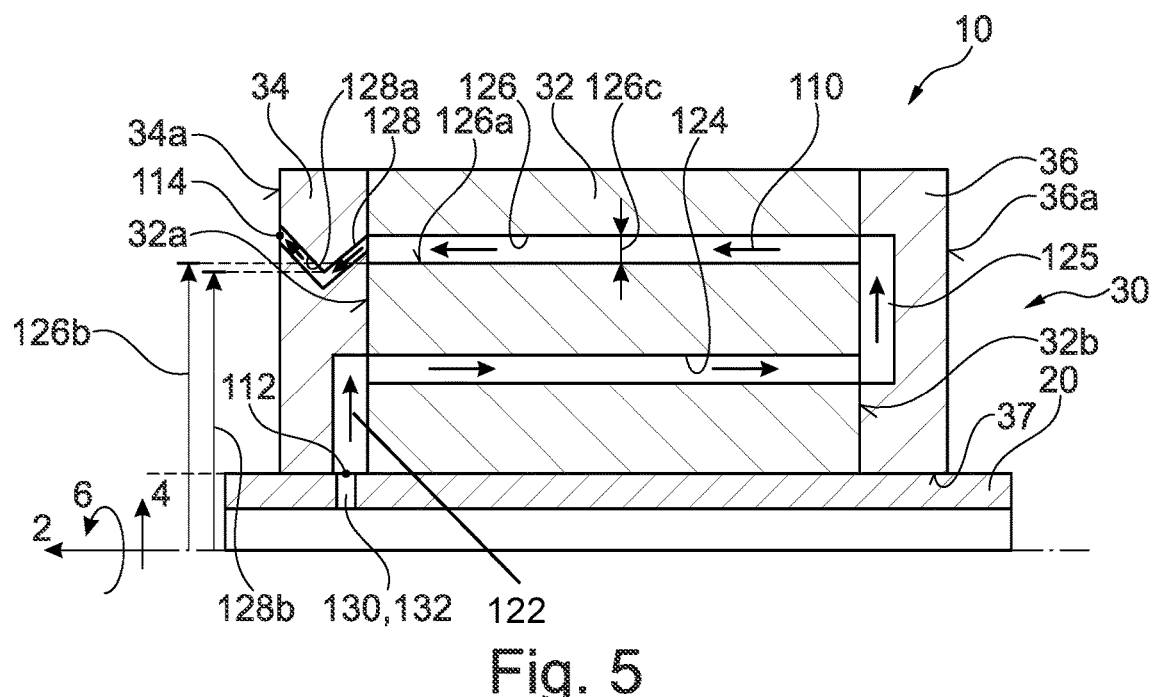
FIG. 5 Shows a schematically simplified excerpt of the rotor assembly in a side cut view according to the first example configuration.

As best seen in FIG. 5. the fluid cooling pathway 110 comprises two cooling channels 124. 126 and three end plate channels 122. 125. 128. More specifically, the fluid cooling pathway 110 comprises a first cooling channel 124 and a second cooling channel 126. As mentioned above. the cooling channels 124. 126 extend through the rotor core 32 from the first axial end 32a to the second axial end 32b. The first cooling channel 124 and the second cooling channel 126 are radially separated in the rotor core 32. A radially inner wall portion 126a of the rotor core 32 restricts the second cooling channel 126 radially inwards. In other embodiments. the first cooling channel 124 and the second cooling channel 126 may be radially and/or circumferentially separated in the rotor core 32. The end plate channels 122. 125. 128 are arranged in the end plates 34. 36. More specifically, an inlet end plate channel 122 is provided in the first end plate 34 (see. FIG. 5 or the lower fluid cooling pathway 110 in FIG. 1). A first downstream end plate channel 125 is provided in the second end plate 36. A second downstream end plate channel 128 is provided in the first end plate 34. The inlet end plate channel 122 defines the pathway inlet 112. An upstream end of the first cooling channel 124 is fluidically connected to the inlet end plate channel 122. A downstream end of the first cooling channel 124 is fluidically connected to the first downstream end plate channel 125. An upstream end of the second cooling channel 126 is fluidically connected to the first downstream end plate channel 125. In other words, an upstream end of the first downstream end plate channel 125 is fluidically connected to a downstream end of the first cooling channel 124. A downstream end of the first downstream end plate channel 125 is fluidically connected to an upstream end of the second cooling channel 126. That means, the first downstream end plate channel 125 may be configured as a connector channel 125 to fluidically connect a downstream end of the first cooling channel 124 and an upstream end of the second cooling channel 126. A downstream end of the second cooling channel 126 is fluidically connected to the second downstream end plate channel 128. A radially outer wall portion 128a of the first end plate 34 restricts the second downstream end plate channel 128 radially outwards. The second downstream end plate channel 128 is further configured as an outlet channel 128 of the fluid cooling pathway 110 to guide cooling fluid out of the rotor 30. Specifically, the second end plate channel 128 defines the pathway outlet 114. As mentioned above, the fluid cooling pathways 110 may be arranged alternatingly in the rotor 30. Thus, a fluid cooling pathway 110 adjacent to the fluid cooling pathway 110 described with respect to FIG. 5 or the lower fluid cooling pathway 110 in FIG. 1. would be arranged mirrored if configured similarly (see, e.g. upper fluid cooling pathway 110 in FIG. 1).

In the first example configuration, the second end plate channel 128 is configured to advantageously increase the filling level of the second cooling channel 126 during operation. Therefore a radially innermost position 128b of the radially outer wall portion 128a is arranged radially inwards of a radially innermost position 126b of the radially inner wall portion 126a. Particularly in operating conditions where the centrifugal force is higher than the gravity force, the second cooling channel 126 can be completely filled with cooling fluid. This may result in an improved cooling power and/or cooling efficiency which in turn may positively affect the efficiency of the performance of the electric machine 1. In other variations, the radially innermost position 128b of the radially outer wall portion 128a may be arranged at the radially innermost position 126b of the radially inner wall portion 126a which also may lead to a complete filling of the second cooling channel 126 with cooling fluid. In further variations, the radially innermost position 128b of the radially outer wall portion 128a may be arranged in a range about the radially innermost position 126b of the radially inner wall portion 126a. This may at least lead to an increased filling level compared to a rotor assembly 10 whose downstream end plate channel, specifically its radially outer wall portion, is arranged above, i.e. which is further radially outward than the range. As mentioned above, the range may extend 50% of a radial height 126c of the second cooling channel 126 radially outwards and/or radially inwards from the radially innermost position 126b. Thereby a filling level of at least 50% relative to the radial height 126c can be achieved in the second cooling channel 126. Specifically, the range may extend 10% of a radial height 126c of the second cooling channel 126 radially outwards and/or radially inwards from the radially innermost position 126b. Thereby a filling level of at least 90% relative to the radial height 126c can be achieved in the second cooling channel 126. More specifically, the range may extend 5% of a radial height 126c of the second cooling channel 126 radially outwards and/or radially inwards from the radially innermost position 126b. Thereby a filling level of at least 95% relative to the radial height 126c can be achieved in the second cooling channel 126.

In variations of the rotor assembly 10, alternatively or additionally, the first end plate channel 125 may be configured to advantageously increase the filling level of the first cooling channel 124 during operation. This will be explained in further detail with respect to the third example configuration according to FIGS. 6 and 7. In some embodiments, the second end plate channel 128 may be configured to advantageously increase the filling level of both of the first cooling channel 124 and second cooling channel 126 during operation. In such cases, the radially innermost position 128b of the radially outer wall portion 128a of the second downstream end plate channel 128 may, for instance, be arranged in the range about or at or radially inwards of a radially innermost position 124b of a radially inner wall portion 124a which restricts the first cooling channel 124 radially inwards.

Although one respective inlet end plate channel 122 for each fluid cooling pathway 110 is shown with respect to the first example configuration, in some variations several or all of the fluid cooling pathways 110 may share the same inlet end plate channel 122. In such cases, the inlet end plate channel 122 may comprise one or more junction portions to distribute cooling fluid to the upstream ends of the several or all first axial cooling channels 124. Analogously, several or all of the fluid cooling pathways 110 may share the connector channel 125 and/or outlet channel 128. This may also be applicable to other example configurations.

Although one respective first cooling channel 124 for each fluid cooling pathway 110 is shown with respect to the first example configuration, one or more fluid cooling pathways 110 may comprise more than one first cooling channel 124. For instance, with respect to the bottom fluid cooling pathway 110 in FIG. 3, two or three first cooling channels 124 may be provided which guide cooling fluid from the inlet end plate channel 122 on the left side to the connector channel 125 on the right side. The more than one first cooling channels 124 may be specifically, circumferentially distanced. Alternatively, or additionally, the more than one first cooling channels 124 may be radially distanced. The more than one first cooling channels 124 may share one or more connector channels 125 or have separate connector channels 125. Analogously, one or more fluid cooling pathways 110 may comprise more than one second cooling channels 126. In some embodiments, one or more third, one or more fourth or one or more n cooling channels may be provided in one or more fluid cooling pathways 110. Thereby, n is to be understood as any natural number, specifically a natural number between one to fifty, more specifically, one to twenty or one to five. It is noted that the term first, second, third, fourth (and so on) in relation to the cooling channel is not necessarily to be understood as referring to a number of cooling channels comprised in the fluid cooling pathway but can indicate the difference between the flow direction of cooling fluid through the cooling channels between the first axial end 32a and the second axial end 32b with respect to one specific fluid cooling pathway, e.g. from right to left or vice versa as seen, for instance, in FIGS. 1 and 5. For instance, the first cooling channel 124 in the upper fluid cooling pathway 110 of FIG. 1 guides cooling fluid from right to left, the second cooling channel 126 guides cooling fluid from left to right. In the lower fluid cooling pathway 110 of FIG. 1, the first cooling channel 124 guides cooling fluid from left to right and the second cooling channel 126 guides cooling fluid from right to left. These explanations may also be applicable to other example configurations.

Generally applicable to all example configurations, the outlet channel 128 may be configured and arranged to guide cooling fluid out of the fluid cooling pathway 110 radially outwardly inclined relative to the axial direction 2 (see, e.g. FIG. 1). Thereby not only the rotor 30 may be cooled by the fluid cooling system 100 but also the stator 210 of the electric machine 1. As shown for instance in FIGS. 1 and 5, the outlet channel 128 may comprise a first channel portion which is radially inwardly inclined relative to the axial direction 2 and a second channel portion which is radially outwardly inclined. The first channel portion may be arranged upstream of the second channel portion. In some embodiments, the first and the channel portions may be formed by drilling holes in the end plate 34, 36. In some embodiments, the outlet channel 128 may be formed by a groove on side face of the respective end plate 34, 36 opposing the respective side face 34$a$, 36$a$ which defines the axial end of the rotor 30. The groove may define an upstream portion of the outlet channel 128. The outlet channel 128 may further comprise a downstream portion which is fluidically connected to the upstream portion and leads to an exterior of the rotor 30, e.g. the other side face 34$a$, 36$a$ and/or to the outer circumference 39 of the rotor 30. The downstream portion may be formed by a groove in the same side face as the upstream portion and/or by a hole extending from the upstream portion an exterior of the rotor 30, e.g. the other side face 34$a$, 36$a$ and/or to the outer circumference 39 of the rotor 30.

Generally applicable to all example configurations, the fluid cooling system 100 may further comprise a cooling fluid supply 130 arranged in the rotating shaft 20. The cooling fluid supply 130 is fluidically connected to the fluid cooling pathways 110. Specifically, the cooling fluid supply 130 is fluidically connected to the inlet end plate channels 122. As shown in FIGS. 1 to 3, the rotating shaft 20 is configured as a hollow shaft to provide cooling fluid from an external cooling fluid source to the fluid cooling pathways 110. Therefore, the cooling fluid supply 130 comprises respective distribution holes 132. The distribution holes 132 extend to an outer circumference of the rotating shaft 20 to fluidically connect with fluid cooling pathway 110, more specifically with the respective pathway inlets 112. The distribution holes 132 may be arranged radially in the rotating shaft 20 at respective positions of the inlet end plate channels 122 to fluidically connect thereto. The hollow shaft may form a distribution chamber 132 which is fluidically connected to the distribution holes 132 and to the external cooling fluid source. The cooling fluid supply 130 may further comprise a connecting port 136 to be fluidically connectable with the external cooling fluid source. The connecting port 136 therefore may form an open end in the rotating shaft 20. In embodiments, the external cooling fluid source may comprise a reservoir and/or a pump. In embodiments, the fluid cooling system 100 may be self-pumping and/or assisted by an external pump. In other embodiments, one or more distribution holes 132 may be provided in the rotating shaft 20 to extend to an outer circumference of the rotating shaft 20. One or more grooves may be provided in the outer circumference of the rotating shaft 20 which are fluidically connected to the one or more distribution holes 132. The one or more grooves may be configured and arranged to guide cooling fluid to the respective inlet end plate channels 122, more specifically to the respective pathway inlets 112. The one or more grooves may extend circumferentially and or axially. In other embodiments, alternatively to the hollow shaft, the rotating shaft 20 may be configured as a sleeved shaft to provide cooling fluid from an external cooling fluid source to the at least one fluid cooling pathway 110 (not shown). Therefore, the rotating shaft 20 may comprise an inner shaft and a shaft sleeve which at least partially surrounds the inner shaft. Between the inner shaft and the shaft sleeve one or more cooling fluid supply lines may be formed to guide cooling fluid axially and/or circumferentially to the fluid cooling pathways 110. One or more distribution holes may be provided in the shaft sleeve to guide cooling fluid to the pathway inlets 112.

Figure 4:
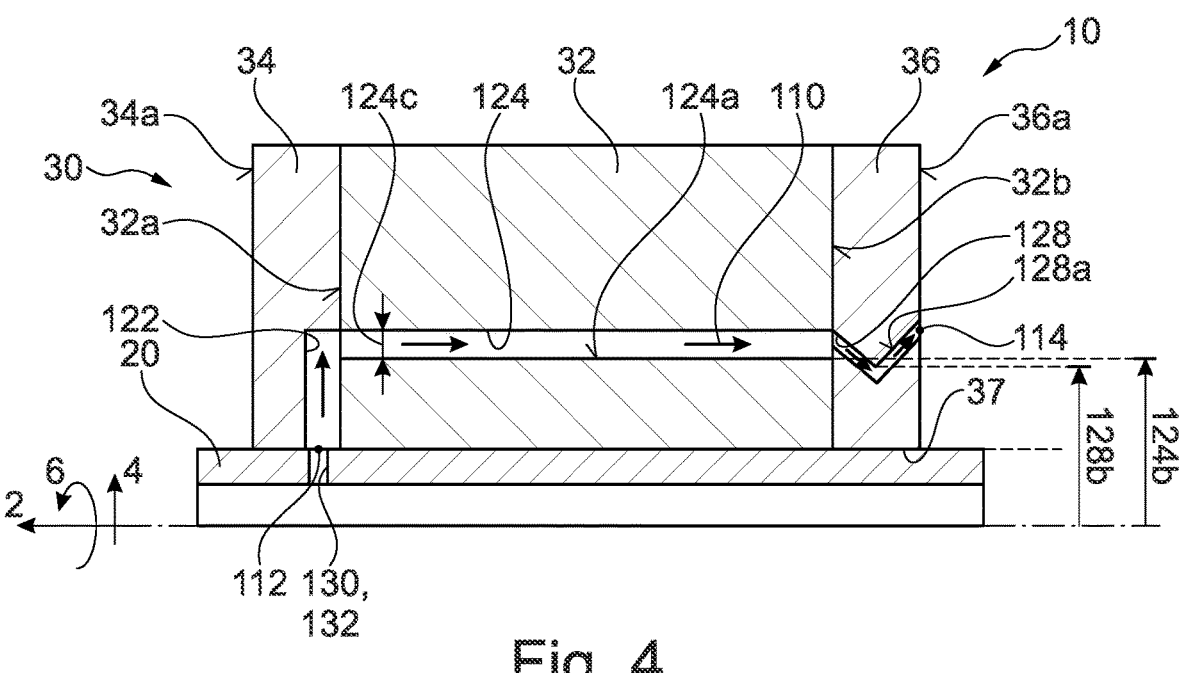
FIG. 4 Shows a schematically simplified excerpt of the rotor assembly in a side cut view according to a second example configuration.

FIG. 4 shows the second example configuration of the rotor assembly 10 which mainly differs from the first example configuration in that only a first cooling channel 124 is comprised in the fluid cooling pathway 110. One or more of the features described with respect to the first example configuration may be applicable to the second example configuration. The fluid cooling pathway 110 comprises one cooling channels 124 and two end plate channels 122, 128. A radially inner wall portion 124$a$ of the rotor core 32 restricts the cooling channel 124 radially inwards. The end plate channels 122, 128 are arranged in the end plates 34, 36. More specifically, an inlet end plate channel 122 is provided in the first end plate 34 (see, FIG. 4). The downstream end plate channel 128 is provided in the second end plate 36. The inlet end plate channel 122 defines the pathway inlet 112. An upstream end of the cooling channel 124 is fluidically connected to the inlet end plate channel 122. A downstream end of the first cooling channel 124 is fluidically connected to the downstream end plate channel 128. A radially outer wall portion 128$a$ of the first end plate 34 restricts the downstream end plate channel 128 radially outwards. The downstream end plate channel 128 is further configured as an outlet channel 128 of the fluid cooling pathway 110 to guide cooling fluid out of the rotor 30. Specifically, the downstream end plate channel 128 defines the pathway outlet 114. The fluid cooling system 100 of this second example configuration may comprise a plurality of fluid cooling pathways 110. As mentioned above, the fluid cooling pathways 110 may be arranged alternatingly in the rotor 30.

In the second example configuration, the outlet channel 128 is configured to advantageously increase the filling level of the cooling channel 124 during operation. Therefore, a radially innermost position 128$b$ of the radially outer wall portion 128$a$ is arranged radially inwards of a radially innermost position 126$b$ of the radially inner wall portion 124$a$ (see, FIG. 4). Particularly in operating conditions where the centrifugal force is higher than the gravity force, the cooling channel 124 can be completely filled with cooling fluid. This may result in an improved cooling power and/or cooling efficiency which in turn may positively affect the efficiency of the performance of the electric machine 1. In other variations, the radially innermost position 128$b$ of the radially outer wall portion 128$a$ may be arranged at the radially innermost position 124$b$ of the radially inner wall portion 124$a$ which also may lead to a complete filling of the cooling channel 124 with cooling fluid. In further variations, the radially innermost position 128$b$ of the radially outer wall portion 128$a$ may be arranged in a range about the radially innermost position 124$b$ of the radially inner wall portion 124$a$. This may at least lead to an increased filling level compared to a rotor assembly 10 whose downstream end plate channel, specifically its radially outer wall portion, is arranged above, i.e. which is further radially outward than the range. As mentioned above, the range may extend 50% of a radial height 124$c$ of the cooling channel 124 radially outwards and/or radially inwards from the radially innermost position 124$b$. Thereby a filling level of at least 50% relative to the radial height 124$c$ can be achieved in the cooling channel 124. Specifically, the range may extend 10% of a radial height 124$c$ of the cooling channel 124 radially outwards and/or radially inwards from the radially innermost position 124$b$. Thereby a filling level of at least 90% relative to the radial height 124$c$ can be achieved in the cooling channel 124. More specifically, the range may extend 5% of a radial height 124$c$ of the cooling channel 124 radially outwards and/or radially inwards from the radially innermost position 124$b$. Thereby a filling level of at least 95% relative to the radial height 124$c$ can be achieved in the cooling channel 124.

Figure 6:
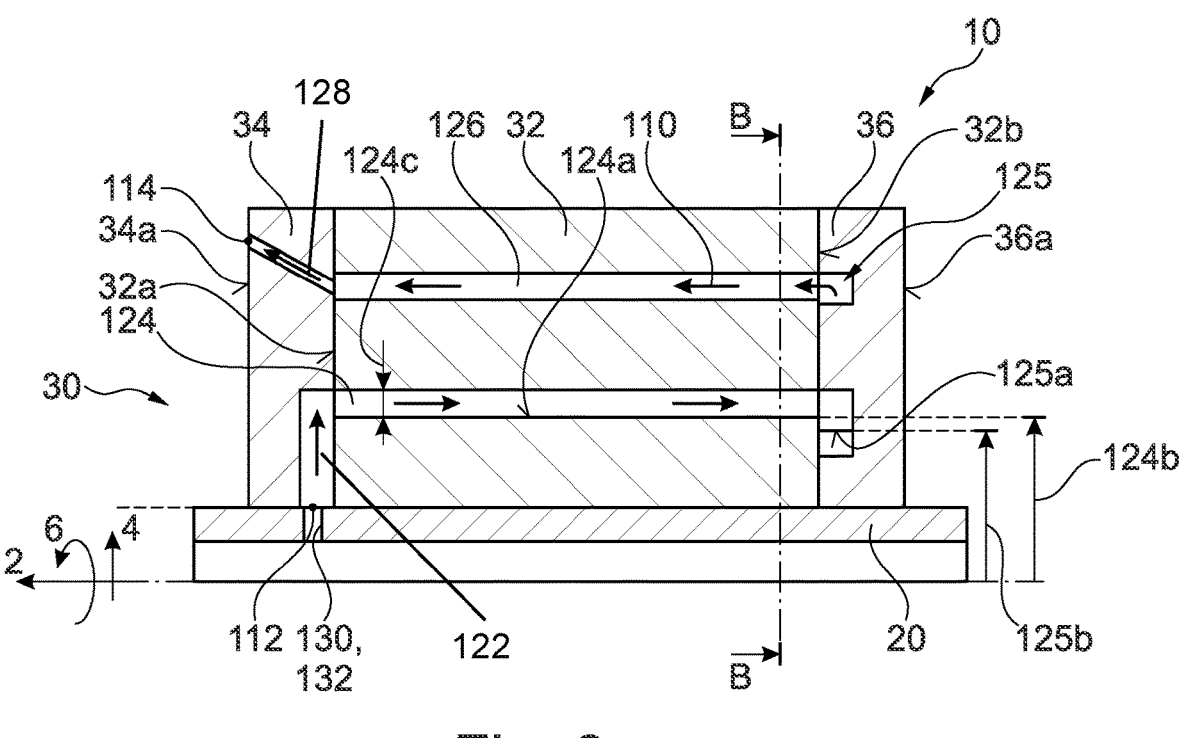
FIG. 6 Shows a schematically simplified excerpt of the rotor assembly in a side cut view according to a third example configuration.
Figure 7:
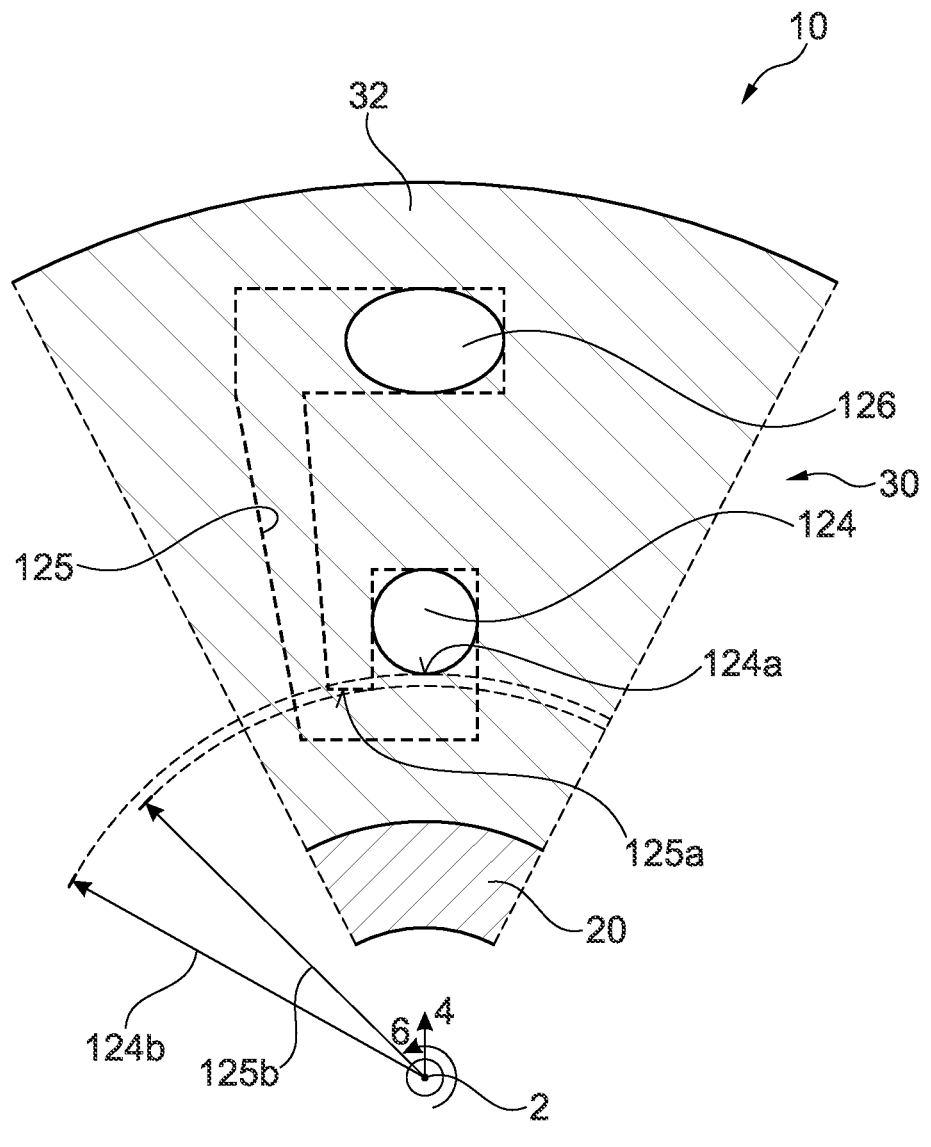
FIG. 7 Shows a sector of the rotor assembly of FIG. 6 in a cut view along the line B-B of FIG. 6.

FIGS. 6 and 7 shows the third example configuration of the rotor assembly 10 which mainly differs from the first example configuration in that only the connector channel 125 is configured to advantageously increase the filling level of the first cooling channel 124 during operation. One or more of the features described with respect to the first example configuration may be applicable to the third example configuration.

As best seen in FIG. 6, the fluid cooling pathway 110 comprises two cooling channels 124, 126 and three end plate channels 122, 125, 128. More specifically, the fluid cooling pathway 110 comprises a first cooling channel 124 and a second cooling channel 126. As mentioned above, the cooling channels 124, 126 extend through the rotor core 32 from the first axial end 32a to the second axial end 32b. The first cooling channel 124 and the second cooling channel 126 are radially separated in the rotor core 32. A radially inner wall portion 124a of the rotor core 32 restricts the first cooling channel 124 radially inwards. In other embodiments, the first cooling channel 124 and the second cooling channel 126 may be radially and/or circumferentially separated in the rotor core 32. The end plate channels 122, 125, 128 are arranged in the end plates 34, 36. More specifically, an inlet end plate channel 122 is provided in the first end plate 34 (see, FIG. 6). A first downstream end plate channel 125 is provided in the second end plate 36. A second downstream end plate channel 128 is provided in the first end plate 34. The inlet end plate channel 122 defines the pathway inlet 112. An upstream end of the first cooling channel 124 is fluidically connected to the inlet end plate channel 122. A downstream end of the first cooling channel 124 is fluidically connected to the first downstream end plate channel 125. An upstream end of the second cooling channel 126 is fluidically connected to the first downstream end plate channel 125. In other words, an upstream end of the first downstream end plate channel 125 is fluidically connected to a downstream end of the first cooling channel 124. A downstream end of the first downstream end plate channel 125 is fluidically connected to an upstream end of the second cooling channel 126. That means, the first downstream end plate channel 125 may be configured as a connector channel 125 to fluidically connect a downstream end of the first cooling channel 124 and an upstream end of the second cooling channel 126. In the schematic cut view of FIG. 7, the connector channel 125 is indicated by the dashed lines. A radially outer wall portion 125a of the second end plate 36 restricts the first downstream end plate channel 125 radially outwards. A downstream end of the second cooling channel 126 is fluidically connected to the second downstream end plate channel 128. The second downstream end plate channel 128 is further configured as an outlet channel 128 of the fluid cooling pathway 110 to guide cooling fluid out of the rotor 30. Specifically, the second end plate channel 128 defines the pathway outlet 114. As mentioned above, the fluid cooling pathways 110 may be arranged alternatingly in the rotor 30.

As best seen in FIG. 7, the first end plate channel 125 of the third example configuration is configured to advantageously increase the filling level of the first cooling channel 125 during operation. Therefore, a radially innermost position 125b of the radially outer wall portion 125a is arranged radially inwards of a radially innermost position 124b of the radially inner wall portion 124a. Particularly in operating conditions where the centrifugal force is higher than the gravity force, the first cooling channel 124 can be completely filled with cooling fluid. This may result in an improved cooling power and/or cooling efficiency which in turn may positively affect the efficiency of the performance of the electric machine 1. In other variations, the radially innermost position 125b of the radially outer wall portion 125a may be arranged at the radially innermost position 124b of the radially inner wall portion 124a which also may lead to a complete filling of the first cooling channel 124 with cooling fluid. In further variations, the radially innermost position 125b of the radially outer wall portion 125a may be arranged in a range about the radially innermost position 124b of the radially inner wall portion 124a. This may at least lead to an increased filling level compared to a rotor assembly 10 whose downstream end plate channel, specifically its radially outer wall portion, is arranged above, i.e. which is further radially outward than the range. As mentioned above, the range may extend 50% of a radial height 124c of the first cooling channel 124 radially outwards and/or radially inwards from the radially innermost position 124b. Thereby a filling level of at least 50% relative to the radial height 124c can be achieved in the first cooling channel 124. Specifically, the range may extend 10% of a radial height 124c of the first cooling channel 124 radially outwards and/or radially inwards from the radially innermost position 124b. Thereby a filling level of at least 90% relative to the radial height 124c can be achieved in the first cooling channel 124. More specifically, the range may extend 5% of a radial height 124c of the first cooling channel 124 radially outwards and/or radially inwards from the radially innermost position 124b. Thereby a filling level of at least 95% relative to the radial height 124c can be achieved in the first cooling channel 124.

As shown in FIG. 6, the outlet channel 128 may be configured and arranged to guide cooling fluid out of the fluid cooling pathway 110 radially outwardly inclined relative to the axial direction 2. Thereby not only the rotor 30 may be cooled by the fluid cooling system 100 but also the stator 210 of the electric machine 1. In variations of the third example configuration, in addition to the connector channel 125, the outlet channel 128 may be configured to advantageously increase the filling level of the second cooling channel 126 during operation as described with respect to the first example configuration.

Generally, although the cooling channels are shown having round (e.g. FIG. 7) or oval cross-sections (e.g. FIG. 3) in a radial plane orthogonally to the axial direction 2, one or more cooling channels may have a different cross-sectional shape. For instance, the cross-section of one or more cooling channels may be annularly shaped, rectangularly shaped, ellipsoidal shaped, polygonal shaped or may be shaped as a bundle of passages and/or comprise fillets in the interior and/or on the side walls restricting the respective cooling channel and/or may have undulated side walls.

Although the present invention has been described above and is defined in the attached claims, it should be understood that the invention may alternatively be defined in accordance with the following embodiments:

1. A rotor assembly (10) for an electric machine (1) comprising:
   a rotating shaft (20),
   a rotor (30) fixed to the rotating shaft (20), the rotor (30) comprising a rotor core (32),
   a first end plate (34) provided at a first axial end (32a) of the rotor core (32) and a second end plate (36) provided at a second axial end (32b) of the rotor core (32), and
   a fluid cooling system (100) comprising at least one fluid cooling pathway (110) provided internally in the rotor (30), the at least one fluid cooling pathway (110) being configured to guide cooling fluid through the rotor (30), wherein the at least one fluid cooling pathway (110) comprises:

at least one cooling channel (124, 126) extending through the rotor core (32) from the first axial end (32*a*) to the second axial end (32*b*), a downstream end plate channel (125, 128) being fluidically connected to a downstream end of the at least one cooling channel (124, 126), wherein a radially innermost position (125*b*, 128*b*) of a radially outer wall portion (125*a*, 128*a*) restricting the downstream end plate channel (125, 128) radially outwards is arranged in a range about or at or radially inwards of a radially innermost position (124*b*, 126*b*) of a radially inner wall portion (124*a*, 126*a*) restricting the at least one cooling channel (124, 126) radially inwards.

2. The rotor assembly (10) of embodiment 1, wherein the range extends 50% , specifically 10% , and more specifically 5% of a radial height (124*c*, 126*c*) of the at least one cooling channel radially outwards and radially inwards from the radially innermost position (124*b*, 126*b*).

3. The rotor assembly (10) of any one of the preceding embodiments, wherein the at least one fluid cooling pathway (110) extends from a pathway inlet (112) in one of the first end plate (34) or the second end plate (36) to a pathway outlet (114) in one of the first end plate (34) or the second end plate (36).

4. The rotor assembly (10) of embodiment 3, wherein the pathway outlet (114) is arranged to discharge cooling fluid to an exterior of the rotor (30) and inside a housing interior (202) of a machine housing (200) of the electric machine (1).

5. The rotor assembly (10) of any one of embodiments 3 or 4, wherein the pathway outlet (114) is arranged radially outward of the pathway inlet (112).

6. The rotor assembly (10) of any one of embodiments 3 to 5, wherein the pathway inlet (112) is arranged at a radially inner circumference (37) of the rotor (30).

7. The rotor assembly (10) of any one of embodiments 3 to 6, wherein the pathway outlet (114) is arranged radially outwards of a radially inner circumference (37) of the rotor (30).

8. The rotor assembly (10) of any one of embodiments 3 to 7, wherein the pathway outlet (114) is arranged at a radially outer circumference (39) of the rotor (30) or at a side face (34*a*, 36*a*) of the rotor (30).

9. The rotor assembly (10) of any one of the preceding embodiments, wherein the downstream end plate channel (125, 128) is a first downstream end plate channel (128) which is further configured as an outlet channel (128) of the at least one fluid cooling pathway (110) to guide cooling fluid out of the rotor (30).

10. The rotor assembly (10) of embodiment 9, wherein the at least one fluid cooling pathway (110) comprises a first cooling channel (124) and a second cooling channel (126), wherein a downstream end of the second cooling channel (126) is fluidically connected to the outlet channel (128).

11. The rotor assembly (10) of embodiment 10, wherein the first cooling channel (124) and the second cooling channel (126) are radially and/or circumferentially distanced.

12. The rotor assembly (10) of any one of embodiments 10 or 11, wherein the at least one fluid cooling pathway (110) further comprises a second downstream end plate channel (125) which is configured as a connector channel (125) to fluidically connect a downstream end of the first cooling channel (124) and an upstream end of the second cooling channel (126).

13. The rotor assembly (10) of embodiment 12, wherein a radially innermost position (125*b*) of a radially outer wall portion (125*a*) restricting the connector channel (125) radially outwards is arranged in a range about or at or radially inwards of the radially innermost position (124*b*) of a radially inner wall portion (124*a*) restricting the first cooling channel (124) radially inwards.

14. The rotor assembly (10) of embodiment 13, wherein the range extends 50% , specifically 10% , and more specifically 5% of a radial height (124*c*) of the first cooling channel radially outwards and radially inwards from the radially innermost position (124*b*).

15. The rotor assembly (10) of any one of embodiments 1 to 8, wherein the at least one fluid cooling pathway (110) comprises a first cooling channel (124) and a second cooling channel (126), wherein the downstream end plate channel (125, 128) is a first downstream end plate channel (125) which is further configured as a connector channel (125) to fluidically connect a downstream end of the first cooling channel (124) and an upstream end of the second cooling channel (126).

16. The rotor assembly (10) of embodiment 15, wherein the first cooling channel (124) and the second cooling channel (126) are radially and/or circumferentially distanced.

17. The rotor assembly (10) of any one of embodiments 15 to 16, wherein the at least one fluid cooling pathway (110) further comprises a second downstream end plate channel (128) which is configured as an outlet channel (128) to guide cooling fluid out of the rotor (30).

18. The rotor assembly (10) of embodiment 16, wherein a downstream end of the second cooling channel (126) is fluidically connected to the outlet channel (128).

19. The rotor assembly (10) of any one of embodiments 9 to 14 or 16 to 18, wherein the outlet channel (128) is configured and arranged to guide cooling fluid out of the fluid cooling pathway (110) radially outwardly inclined relative to the axial direction (2).

20 The rotor assembly (10) of any one of embodiments 9 to 14 or 16 to 19, if at least dependent on embodiment 3, wherein the outlet channel (128) defines the pathway outlet (114).

20a. The rotor assembly (10) of any one of embodiments 9 to 14 or 16 to 20, wherein the outlet channel (128) comprises a first channel portion which is radially inwardly inclined relative to the axial direction (2) and a second channel portion which is radially outwardly inclined, and wherein the second channel portion is arranged downstream of the first channel portion.

21. The rotor assembly (10) of any one of the preceding embodiments, wherein the downstream end plate channel (125, 128) is arranged in one of the first end plate (34) and the second end plate (36).

22. The rotor assembly (10) of any one of the preceding embodiments, if at least dependent on any one of embodiments 12 to 14 or 15 to 17, wherein one of the connector channel (125) and the outlet channel (128) is arranged in one of the first end plate (34) and the second end plate (36).

23. The rotor assembly (10) of embodiment 22, wherein the other of the connector channel (125) and the outlet channel (128) is arranged in the other of the first end plate (34) and the second end plate (36).

24. The rotor assembly (10) of any one of the preceding embodiments, wherein the at least one fluid cooling pathway (110) further comprises an inlet end plate channel (122) to guide cooling fluid into the rotor (30).

25. The rotor assembly (10) of embodiment 24, wherein the inlet end plate channel (122) is arranged in one of the first end plate (34) and the second end plate (36).

26. The rotor assembly (10) of embodiment 24, if at least dependent on any one of embodiments 12 to 14 or 15 to 17, wherein the inlet end plate channel (122) and the outlet channel (128) are arranged in the same of the first end plate (34) and the second end plate (36).

27. The rotor assembly (10) of any one of embodiments 24 to 26, if at least dependent on embodiment 3, wherein the inlet end plate channel (122) defines the pathway inlet (112).

28. The rotor assembly (10) of any one of embodiments 24 to 27, wherein the inlet end plate channel (122) is fluidically connected to an upstream end of the at least one cooling channel (124).

29. The rotor assembly (10) of any one of the preceding embodiments, wherein the fluid cooling system (100) further comprises a cooling fluid supply (130) arranged in the rotating shaft (20) and fluidically connected to the at least one fluid cooling pathway (110).

30. The rotor assembly (10) of embodiment 29, wherein the rotating shaft (20) is configured as a hollow shaft or as a sleeved shaft to provide cooling fluid from an external cooling fluid source to the at least one fluid cooling pathway (110).

31. The rotor assembly (10) of any one of embodiments 29 or 30, wherein the cooling fluid supply (130) comprises at least one distribution hole (132) which extends to an outer circumference of the rotating shaft (20) to fluidically connect with the at least one fluid cooling pathway (110).

32. The rotor assembly (10) of any one of the preceding embodiments, wherein the fluid cooling system (100) comprises a plurality of fluid cooling pathways (110) which are distributed circumferentially in the rotor (30).

33. The rotor assembly (10) of embodiment 32, wherein the fluid cooling pathways (110) are arranged alternatingly in the rotor (30).

34. The rotor assembly (10) of any one of embodiments 32 or 33, wherein a number of fluid cooling pathways (110) is equal to a number of magnetic poles of the rotor (30).

35. The rotor assembly (10) of any one of the preceding embodiments, wherein the rotor core (32) is formed of a plurality of steel plates.

36. The rotor assembly (10) of any one of the preceding embodiments, wherein the rotor core (32) is fixed to the rotating shaft (20).

37. The rotor assembly (10) of any one of the preceding embodiments, wherein the rotor core (32) is formed of a plurality of lamination stacks (33).

38. The rotor assembly (10) of embodiment 37, wherein the lamination stacks (33) may be rotationally staggered.

39. The rotor assembly (10) of any one of the preceding embodiments, wherein the first end plate (34) and the second end plate (36) are arranged to sandwich the rotor core (32) from both axial sides (32a, 32b) in opposing axial directions (2).

40. An electric machine (1) comprising:
    a machine housing (200) defining a housing interior (202),
    a stator assembly (210) arranged in the housing interior (202), and
    a rotor assembly (10) according to any one of the preceding embodiments, wherein the rotor assembly (10) is arranged in the housing interior (202).

41. The electric machine (1) of embodiment 40, wherein the stator assembly (210) is an annular stator assembly, and wherein the rotor assembly (10) is radially surrounded by the stator assembly (210).

42. The electric machine (1) of any one of embodiments 40 or 41, wherein the stator assembly (210) comprises a stator core (212) and stator windings (214).

43. The rotor assembly (10) of embodiment 42, if at least dependent on embodiment 3, wherein the pathway outlet (114) is arranged to discharge cooling fluid to end turns of the stator windings (214) inside the housing interior (202).

44. The electric machine (1) of any one of embodiments 40 to 43, wherein the rotating shaft (20) is rotationally supported in the machine housing (200).

REFERENCE SIGN LIST

1 Electric Motor
2 Axial direction
4 Radial direction
6 Circumferential direction
10 Rotor assembly
20 Rotating shaft
30 Rotor
32 Rotor core
32a First axial end
32b Second axial end
33 Lamination stack
34 First end plate
34a First side face
36 Second end plate
36a Second side face
37 Radially inner circumference of rotor
39 Radially inner circumference of rotor
100 Fluid cooling system
110 Fluid cooling pathway
112 Pathway inlet
114 Pathway outlet
122 Inlet end plate channel
124 Cooling channel; first channel
124a Radially inner wall portion of first cooling channel
124b Radially innermost portion of radial inner wall portion
124c Radial height of first cooling channel
125 Downstream end plate channel; connector channel
125a Radially outer wall portion of connector channel
125b Radially innermost position of radially outer wall portion
126 Cooling channel; second channel
126a Radially inner wall portion of second cooling channel
126b Radially innermost portion of radial inner wall portion
126c Radial height of second cooling channel
128 Downstream end plate channel; outlet channel
128a Radially outer wall portion of outlet channel
128b Radially innermost position of radially outer wall portion
130 Cooling fluid supply 132 Distribution hole
134 Distribution chamber
136 Connecting port
200 Motor housing
202 Housing interior
210 Stator assembly
212 Stator core
214 Stator windings

The invention claimed is:

1. A rotor assembly for an electric machine comprising:
a rotating shaft,
a rotor fixed to the rotating shaft, the rotor comprising a rotor core, a first end plate provided at a first axial end of the rotor core and a second end plate provided at a second axial end of the rotor core, and
a fluid cooling system comprising at least one fluid cooling pathway provided internally in the rotor, the at least one fluid cooling pathway being configured to guide cooling fluid through the rotor,
wherein the at least one fluid cooling pathway comprises:
at least one cooling channel extending through the rotor core from the first axial end to the second axial end,
a downstream end plate channel being fluidically connected to a downstream end of the at least one cooling channel,
wherein a radially innermost position of a radially outer wall portion restricting the downstream end plate channel radially outwards is arranged in a range about or at or radially inwards of a radially innermost position of a radially inner wall portion restricting the at least one cooling channel radially inwards;
wherein the downstream end plate channel is a first downstream end plate channel which is further configured as an outlet channel of the at least one fluid cooling pathway to guide cooling fluid out of the rotor, and
wherein the outlet channel comprises a first channel portion which is radially inwardly inclined relative to the axial direction and a second channel portion which is radially outwardly inclined, and wherein the second channel portion is arranged downstream of the first channel portion.

2. The rotor assembly of claim 1, wherein the range extends 50% of a radial height of the at least one cooling channel radially outwards and radially inwards from the radially innermost position.

3. The rotor assembly of claim 1, wherein the range extends 10% of a radial height of the at least one cooling channel radially outwards and radially inwards from the radially innermost position.

4. The rotor assembly of claim 3, wherein a pathway outlet is arranged at a radially outer circumference of the rotor or at a side face of the rotor.

5. The rotor assembly of claim 1, wherein the range extends 5% of a radial height of the at least one cooling channel radially outwards and radially inwards from the radially innermost position.

6. The rotor assembly of claim 1, wherein the at least one fluid cooling pathway extends from a pathway inlet in one of the first end plate or the second end plate to a pathway outlet in one of the first end plate or the second end plate.

7. The rotor assembly of claim 6, wherein the pathway outlet is arranged to discharge cooling fluid to an exterior of the rotor and inside a housing interior of a machine housing of the electric machine.

8. The rotor assembly of claim 1, wherein the at least one fluid cooling pathway comprises a first cooling channel and a second cooling channel, wherein a downstream end of the second cooling channel is fluidically connected to the outlet channel.

9. The rotor assembly of claim 8, wherein the first cooling channel and the second cooling channel are at least one of radially distanced and circumferentially distanced.

10. The rotor assembly of claim 8, wherein the at least one fluid cooling pathway further comprises a second downstream end plate channel which is configured as a connector channel to fluidically connect a downstream end of the first cooling channel and an upstream end of the second cooling channel.

11. A rotor assembly for an electric machine comprising:
a rotating shaft,
a rotor fixed to the rotating shaft, the rotor comprising a rotor core, a first end plate provided at a first axial end of the rotor core and a second end plate provided at a second axial end of the rotor core, and
a fluid cooling system comprising at least one fluid cooling pathway provided internally in the rotor, the at least one fluid cooling pathway being configured to guide cooling fluid through the rotor,
wherein the at least one fluid cooling pathway comprises:
at least one cooling channel extending through the rotor core from the first axial end to the second axial end,
a downstream end plate channel being fluidically connected to a downstream end of the at least one cooling channel,
wherein a radially innermost position of a radially outer wall portion restricting the downstream end plate channel radially outwards is arranged in a range about or at or radially inwards of a radially innermost position of a radially inner wall portion restricting the at least one cooling channel (124, 126) radially inwards;
wherein the at least one fluid cooling pathway comprises a first cooling channel and a second cooling channel, wherein the downstream end plate channel is a first downstream end plate channel which is further configured as a connector channel to fluidically connect a downstream end of the first cooling channel and an upstream end of the second cooling channel,
wherein the at least one fluid cooling pathway further comprises a second downstream end plate channel which is configured as an outlet channel to guide cooling fluid out of the rotor, and
wherein the outlet channel comprises a first channel portion which is radially inwardly inclined relative to the axial direction and a second channel portion which is radially outwardly inclined, and wherein the second channel portion is arranged downstream of the first channel portion.

12. The rotor assembly of any one of claim 11, wherein the outlet channel is configured and arranged to guide cooling fluid out of the fluid cooling pathway radially outwardly inclined relative to the axial direction.

13. The rotor assembly of any one of claim 1 or 11, wherein the rotor core comprises a plurality of circumferentially distributed permanent magnets.

14. The rotor assembly of any one of claim 1 or 11, wherein the at least one fluid cooling pathway extends from a pathway inlet in one of the first end plate or the second end plate to a pathway outlet in one of the first end plate or the second end plate, and wherein the outlet channel defines the pathway outlet.

15. The rotor assembly of claim 1, wherein the at least one fluid cooling pathway further comprises an inlet end plate channel to guide cooling fluid into the rotor, and wherein the inlet end plate channel is arranged in one of the first end plate and the second end plate.

16. The rotor assembly of claim 1, wherein the fluid cooling system further comprises a cooling fluid supply arranged in the rotating shaft and fluidically connected to the at least one fluid cooling pathway.

17. The rotor assembly of claim 1, wherein the fluid cooling system comprises a plurality of fluid cooling pathways which are distributed circumferentially in the rotor.

18. An electric machine comprising:

a machine housing defining a housing interior, a stator assembly arranged in the housing interior, and a rotor assembly according to claim 1 or claim 11, wherein the rotor assembly is arranged in the housing interior.

19. The electric machine of claim 18, wherein the stator assembly comprises a stator core and stator windings.

20. The electric machine of claim 19, wherein the at least one fluid cooling pathway extends from a pathway inlet in one of the first end plate or the second end plate to a pathway outlet in one of the first end plate or the second end plate, and wherein the pathway outlet is arranged to discharge cooling fluid to end turns of the stator windings inside the housing interior.

\* \* \* \* \*